United States Patent
Goodman

(10) Patent No.: US 8,384,754 B2
(45) Date of Patent: Feb. 26, 2013

(54) METHOD AND SYSTEM OF PROVIDING LIGHTING FOR VIDEOCONFERENCING

(75) Inventor: Lee N. Goodman, Tyngsboro, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 924 days.

(21) Appl. No.: 12/486,370

(22) Filed: Jun. 17, 2009

(65) Prior Publication Data

US 2010/0321467 A1 Dec. 23, 2010

(51) Int. Cl.
*H04N 7/14* (2006.01)

(52) U.S. Cl. ............... 348/14.01; 348/14.05; 348/14.07; 715/716

(58) Field of Classification Search .... 348/14.01–14.16; 370/259–271, 351–356; 709/201–207, 217–248; 455/412.1–420, 426.1, 426.2, 461–466, 550.1–560, 455/575.1–575.9, 90.1–90.3
See application file for complete search history.

(56) References Cited

U.S. PATENT DOCUMENTS

| | | | | |
|---|---|---|---|---|
| 5,648,814 A | * | 7/1997 | Munson | 348/14.1 |
| 6,344,874 B1 | * | 2/2002 | Helms et al. | 348/164 |
| 6,980,697 B1 | * | 12/2005 | Basso et al. | 382/274 |
| 6,987,876 B2 | * | 1/2006 | Silber et al. | 382/152 |
| 7,965,859 B2 | * | 6/2011 | Marks | 382/100 |
| 2006/0017805 A1 | * | 1/2006 | Rodman | 348/14.02 |
| 2007/0139515 A1 | * | 6/2007 | Du Breuil | 348/14.01 |
| 2008/0246833 A1 | * | 10/2008 | Yasui et al. | 348/14.08 |
| 2009/0086013 A1 | * | 4/2009 | Thapa | 348/14.08 |

\* cited by examiner

*Primary Examiner* — Hemant Patel

(57) ABSTRACT

An approach provides lighting for a videoconferencing system to improve an image of a user of the videoconferencing system. Light is emitted onto the user of a videoconferencing system, and is controlled onto the user in conjunction with capturing of the image of the user by the videoconferencing system to improve the captured image.

20 Claims, 8 Drawing Sheets

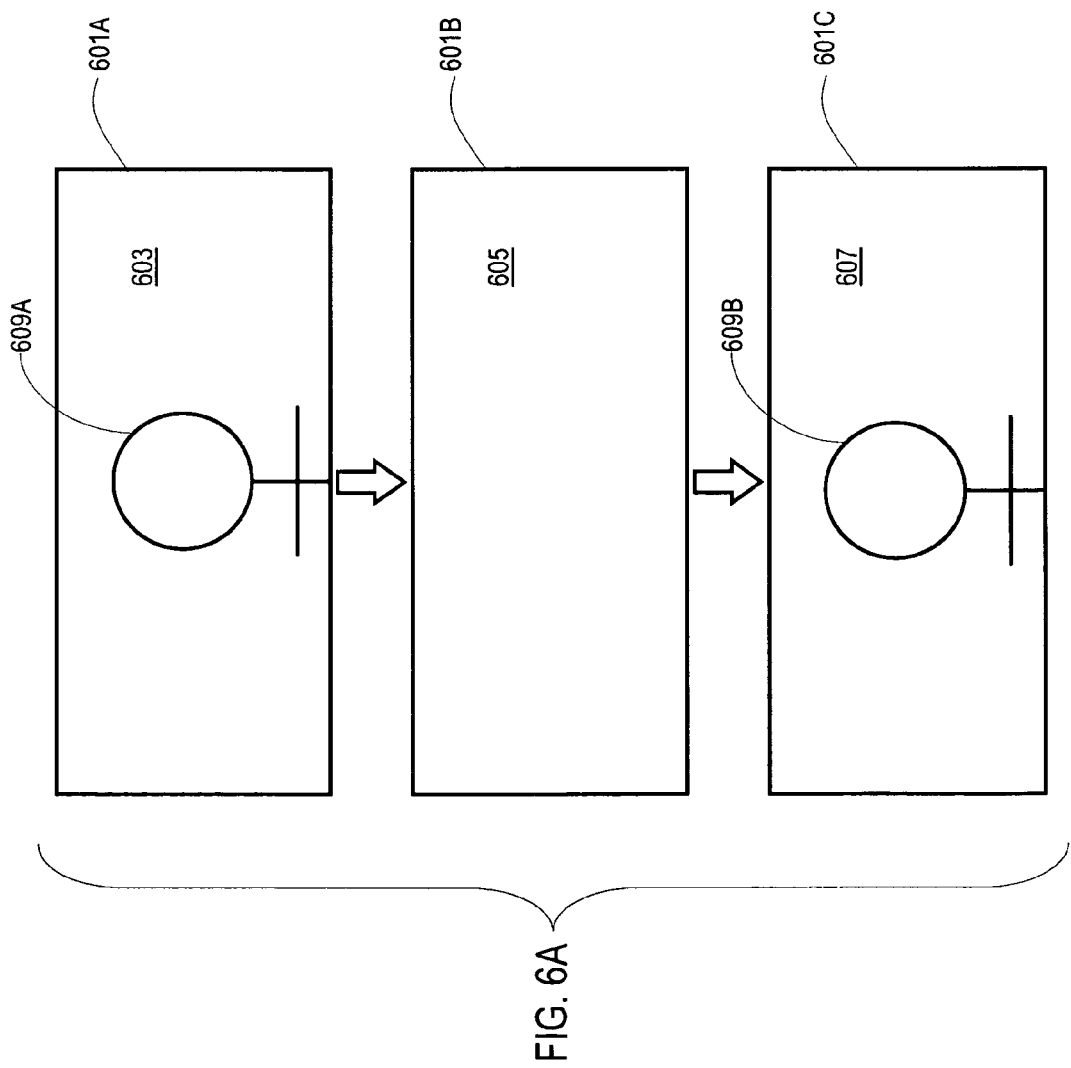

METHOD AND SYSTEM OF PROVIDING LIGHTING FOR VIDEOCONFERENCING

BACKGROUND OF THE INVENTION

Modern communication systems allow people to communicate in a face-to-face manner from distances using videoconferencing systems, such as a standard videoconferencing system, telepresence system, etc. Despite advances in display and imaging technology, little development has been offered with respect to how such images are captured. Poorly captured images cannot, in practical terms, be processed in real-time to yield acceptable images during a video conference. Moreover, if users cannot perceive the details of a person properly, the purpose of a video session is gravely undermined. Thus, there is a need for ensuring that videoconferencing systems capture high quality images of the users.

BRIEF DESCRIPTION OF THE DRAWINGS

Various embodiments are illustrated by way of example, and not by way of limitation, in the figures of the accompanying drawings in which like reference numerals refer to similar elements and in which:

FIG. 6A depicts a series of screenshots of a monitor display used as a light emitting device for a user videoconferencing system, according to various embodiments;

DESCRIPTION OF THE PREFERRED EMBODIMENT

An apparatus, method, and software for providing improved images for videoconferencing are described. In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the present invention.

Figure 1:
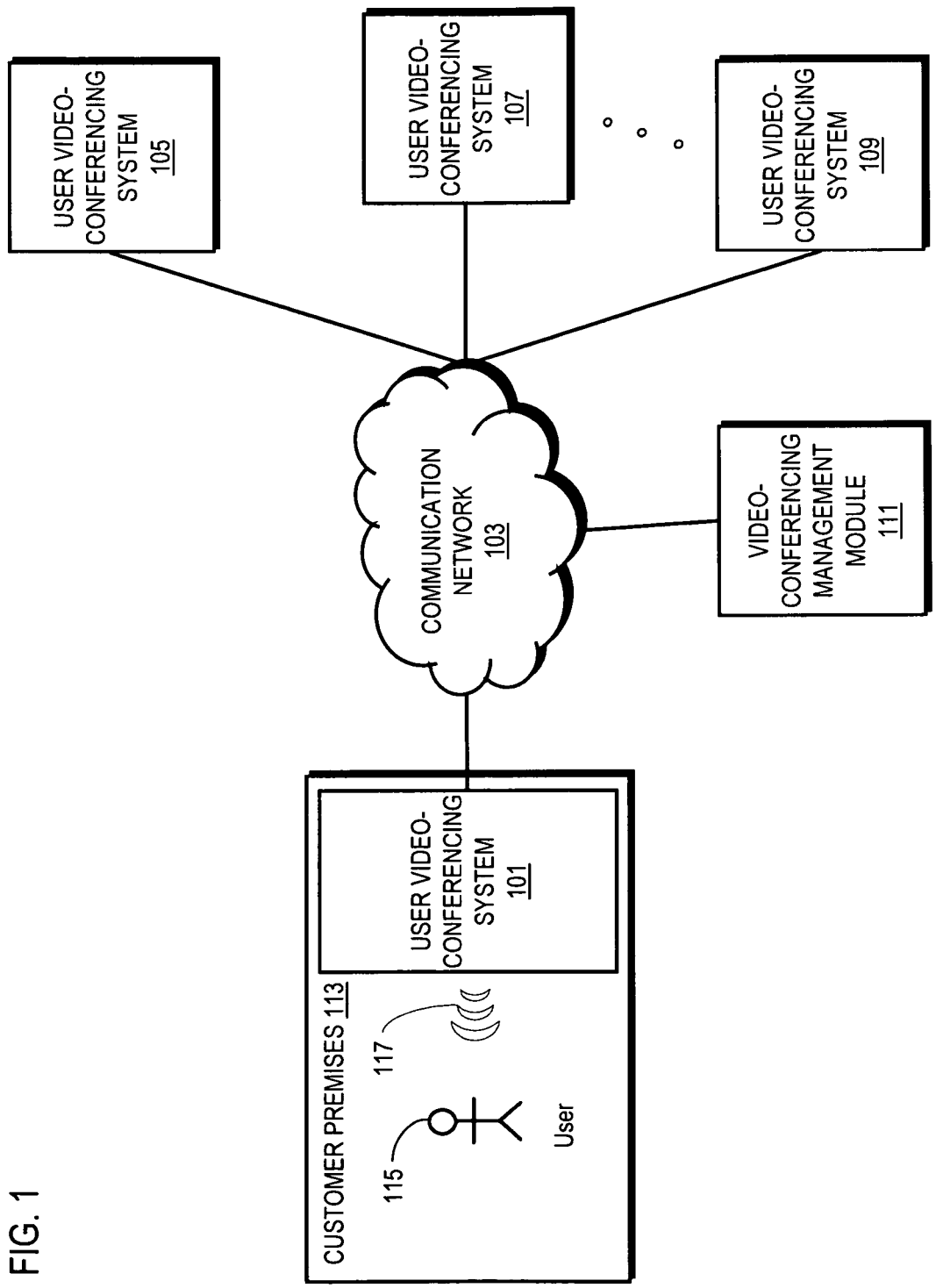
FIG. 1 is a diagram of an architecture for providing lighting for videoconferencing, according to various embodiments.

FIG. 1 is a diagram of architecture for providing lighting for videoconferencing, according to various embodiments. In the embodiment depicted, a user videoconferencing system 101 can communicate via a communication network 103 with one or more user videoconferencing systems 105, 107, . . . , 109. The communication network and associated communication conduits can include the use of any form of wired or wireless communication architecture (e.g., land-line, cable, fiber optic, satellite-based, cellular, or other communication architecture). A videoconferencing module 111 can be provided, for example, by a service provider, to manage and bill for videoconferencing services using the communication network 103.

It is recognized that most homes and offices, where videoconferencing systems are utilized, have lighting that is not conducive to capturing facial features of the people using such systems. For example, many homes and offices have overhead lighting that can create shadows on the face of the users. Also, table lamps and other non-overhead lighting is likely to be positioned behind or not directly in front of a user, and therefore can cause the face of the user to be under lit and the image resolution of the face of the user to be of low quality. Such low resolution quality is especially noticeable when using, for example, a high-definition (HD) video conferencing system.

In the embodiment depicted in FIG. 1, the user videoconferencing system 101 is provided at a customer premises 113, which can be a residence, business office, etc. A user 115 at the customer premises 113 can utilize the user videoconferencing system 101 to send and receive videoconferencing services. The user videoconferencing system 101 is configured to emit light 117 onto the user 115 in order to modify (e.g., improve) the image of the user 115 captured by the user videoconferencing system 101.

Figure 2:
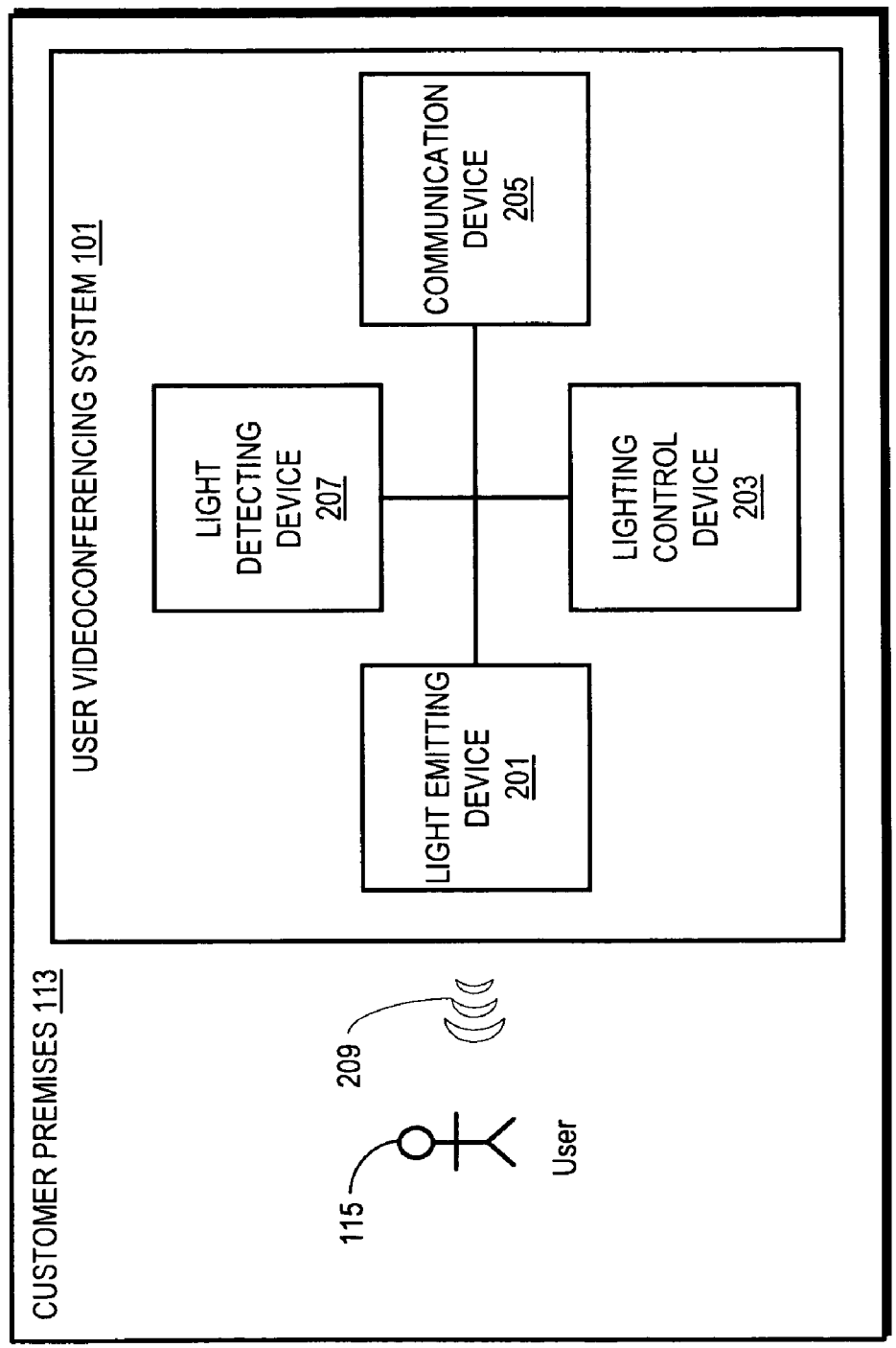
FIG. 2 is a diagram of a customer premises including a user videoconferencing system, according to various embodiments.

FIG. 2 is a diagram of a customer premises 113 including a user videoconferencing system 101, according to various embodiments. The user videoconferencing system 101 includes a light emitting device 201, a lighting control device 203, a communication device 205, and a light detecting device 207. The user videoconferencing system 101 also includes a video capture device (not shown in FIG. 2) and an audio capture device (not shown). The various components of the videoconferencing system 101 can be housed in a single housing (e.g., a set-top box (STB)), or one or more of the components can be housed in plural housings that are in communication with each other either by wired connections or wireless connections. The user videoconferencing system 101 can include or be used in conjunction with a monitor display (not shown in FIG. 2), such as a television, computer monitor, or other display, that can have a standard-definition display, a high-definition display, three-dimensional display technology, or any other display technology. Additionally, the user videoconferencing system 101 can include or be used in conjunction with an audio output source (not shown).

The light emitting device 201 is used to project or emit light 209 onto the user 115 to improve (or otherwise alter) the image of the user 115 captured by the video capture device of the user videoconferencing system 101. The lighting control device 203 controls a level of light emitted from the light emitting device 201, which can be based on the intensity/brightness of light emitted and/or the color of light emitted, based on predetermined settings, manual or automatic user settings, the level of light detected by the light detecting device 207, etc., in order to achieve the desired resolution of the captured image. The light detecting device 207 can be configured as a light sensor that detects the ambient light conditions in which the system 101 is operating, or as an electronic analysis device that performs an analysis of the image captured by the video capture device to determine the light level in the captured images, particularly on the face of the user 115. The light detecting device can be provided as an external sensor that senses ambient light, or the camera lens itself can be used as the light detecting device to sense the amount of light. The lighting control can be manual, automatic, or some combination thereof using the lighting control device. For example, the lighting control device can be used in conjunction with the light detecting device to provide a rough automatic adjustment of the light emitted onto the user, and then the user could use the lighting control device to fine tune the setting to achieve a desired image.

The communication device 205 provides communication with other user videoconferencing systems, such as user videoconferencing systems 105, 107, . . . 109, via the communication network 103 and in conjunction with the videoconferencing management module 111.

Figure 3:
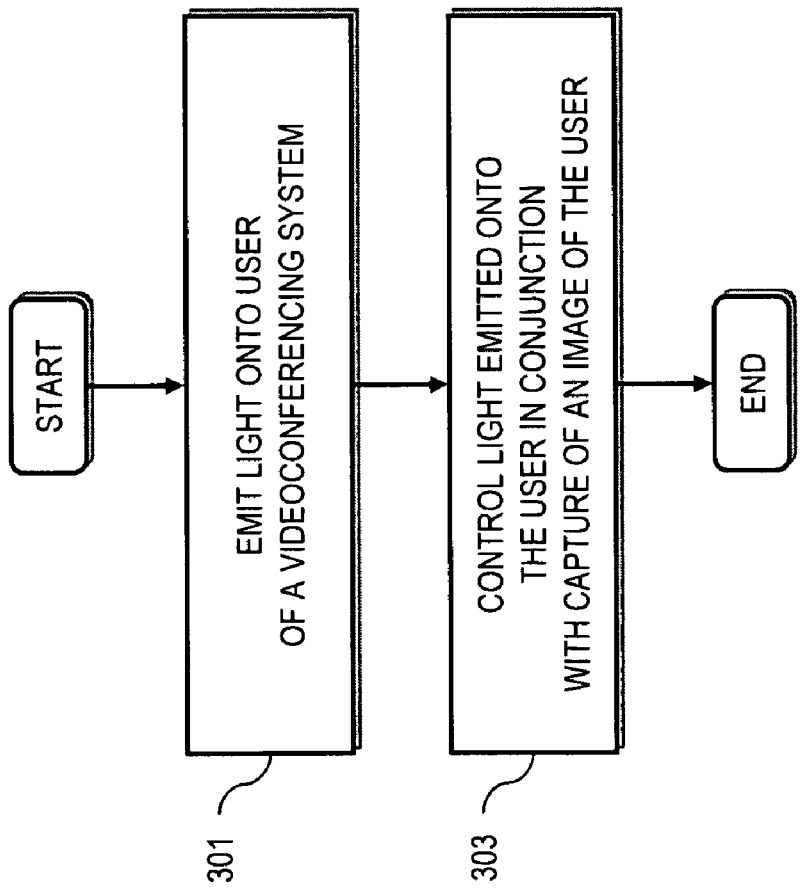
FIG. 3 is a flowchart of a process of providing improved videoconferencing images, according to various embodiments.

FIG. 3 is a flowchart of a method of providing improved videoconferencing images, according to various embodiments. In step 301, light is emitted onto a user of a videoconferencing system. For example, with reference to the embodiment depicted in FIG. 2, the light emitting device 201 emits light 209 onto the user 115. And in step 303, light emitted onto the user is controlled in conjunction with the capture of an image of the user. Thus, based on predetermined settings, manual or automatic user settings, the level of light (e.g., intensity, color, etc.) detected by the light detecting device 207, etc., the lighting control device 203 controls the light 209 emitted onto the user 115 in order to enhance the quality of the image captured by the video capture device of the user videoconferencing system 101, for example, to achieve the proper frame rate and resolution necessary to provide a high definition image.

Several different embodiments of the light emitting device and lighting control device are described below with respect to FIGS. 4, 5, 6A, and 6B. These embodiments are shown by way of illustration and not limitation.

Figure 4:
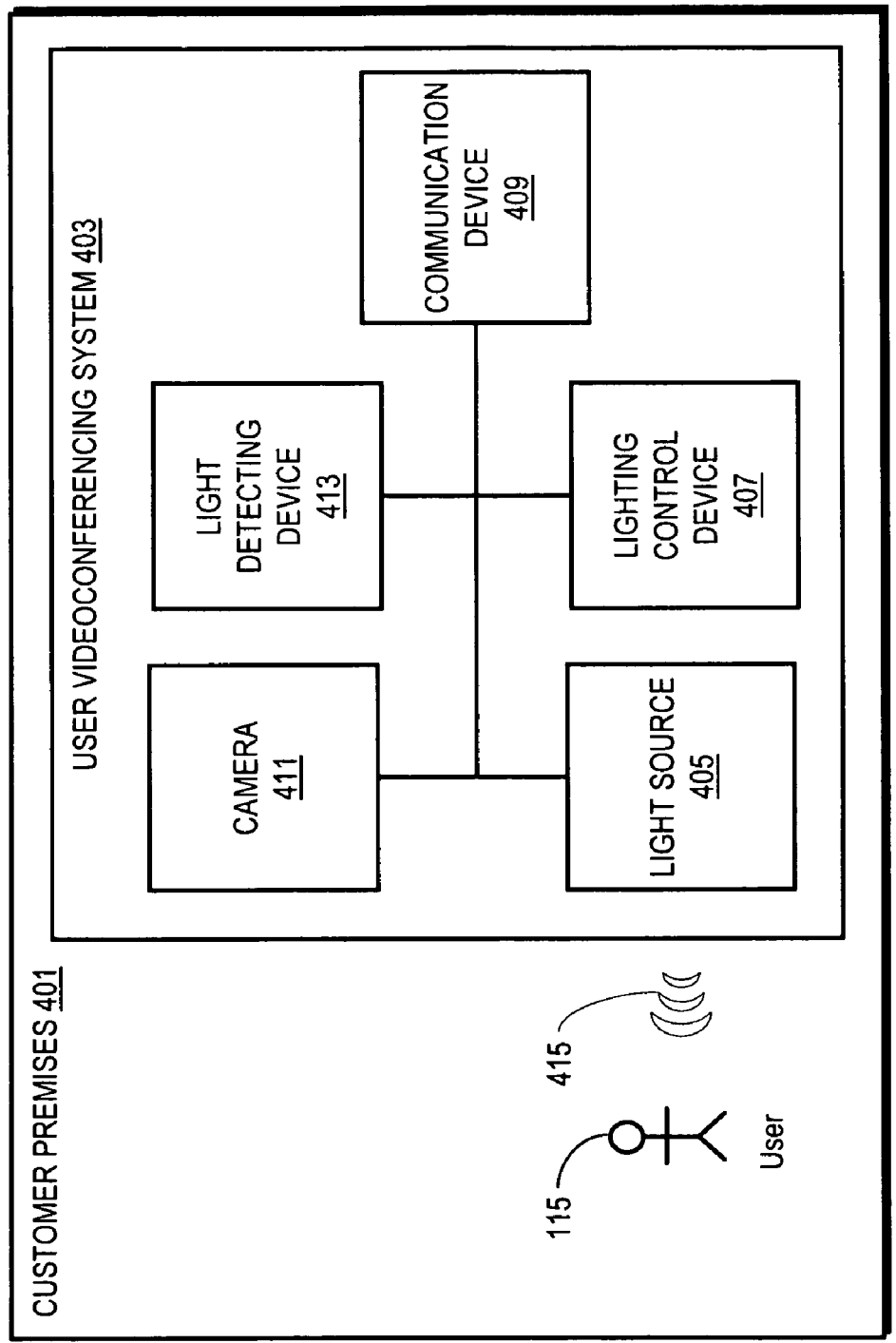
FIG. 4 is a diagram of a customer premises including a user videoconferencing system using a light as a light emitting device, according to various embodiments.

FIG. 4 is a diagram of a customer premises 401 including a user videoconferencing system 403 using a light source 405 as a light emitting device, according to various embodiments. The user videoconferencing system 403 includes the light source 405, a lighting control device 407, a communication device 409, a video camera or video capture device 411, and a light detecting device 413.

The light source 405 is used in conjunction with the camera 411, and is configured to project or emit light 415 onto the user 115 to improve the image of the user 115 captured by the video camera 411 of the videoconferencing system 403. The light source can include one or more lights that can be provided in a housing separate from the camera 411 and connected thereto by wires or wirelessly, or that can be incorporated into the housing of the camera 411. The lighting control device 407 controls light emitted from the light source 405, based on predetermined settings, manual or automatic user settings, the level of light detected by the light detecting device 413, etc. The light source 405 can be any type of light, such as a standard light bulb, halogen light, incandescent light, any type of light emitting diode (LED), fluorescent light, etc. One embodiment of such a light source includes a ring of white LEDs that encircle the lens of the camera. The light source can be controlled to control the intensity and/or color of light emitted onto the user in order to achieve a high resolution image of the user.

Figure 5:
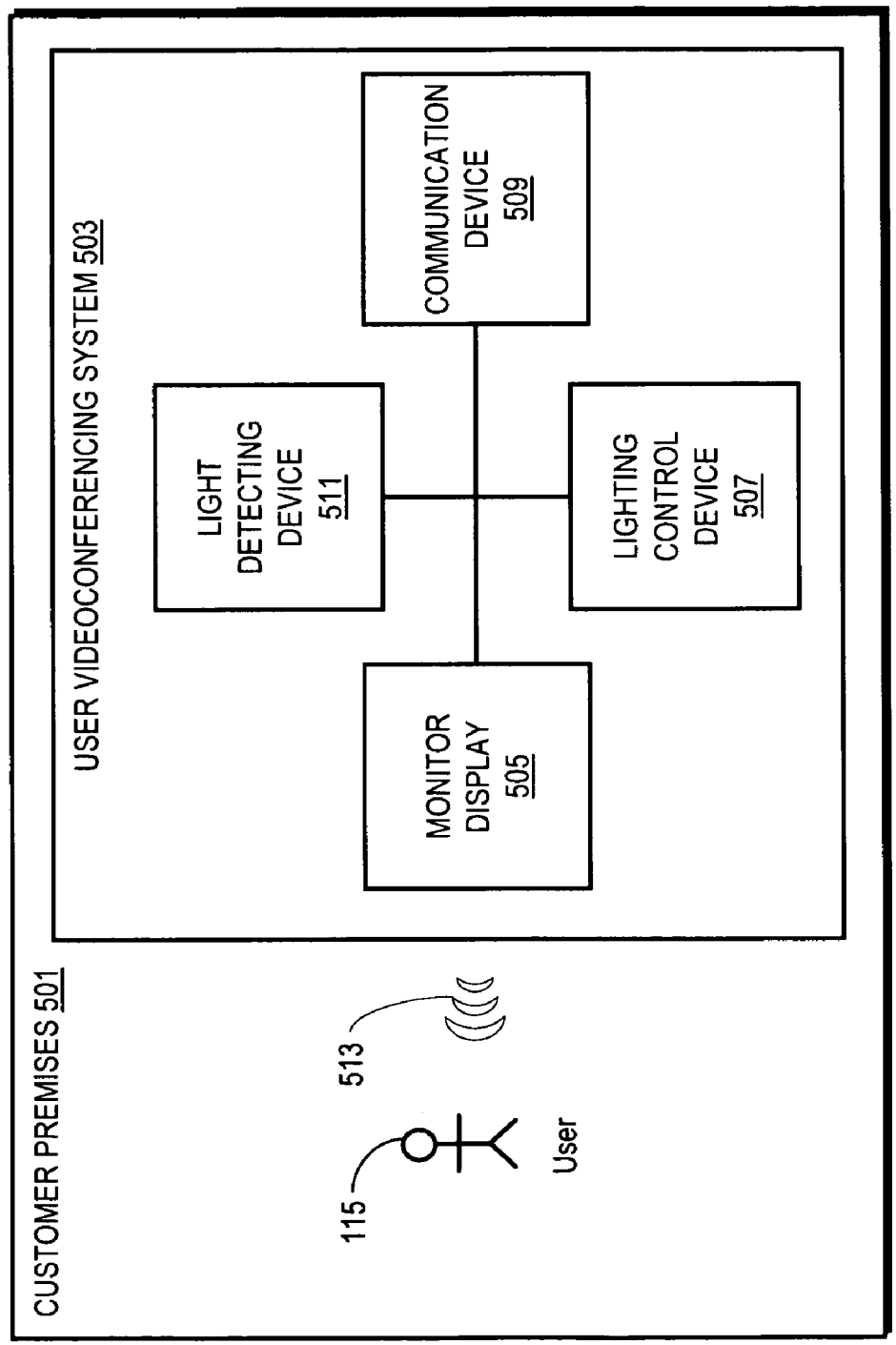
FIG. 5 is a diagram of a customer premises including a user videoconferencing system using a monitor display as a light emitting device, according to various embodiments.

FIG. 5 is a diagram of a customer premises 501 including a user videoconferencing system 503 using a monitor display 505 as a light emitting device, according to various embodiments. The user videoconferencing system 503 includes the monitor display 505, a lighting control device 507, a communication device 509, and a light detecting device 511.

The monitor display 505 is used as a light emitting device in conjunction with a video camera (not shown in FIG. 5), and is configured to project or emit light 513 onto the user 115 to enhance the image of the user 115 captured by the video camera of the videoconferencing system 503. The lighting control device 507 controls light emitted from the monitor display 505, based on predetermined settings, manual or automatic user settings, the level of light detected by the light detecting device 511, etc. For example, the lighting control device 507 can be configured to control the monitor display 505 to display intermittent brightness control frame images to control the intensity/brightness and/or color of light 513 emitted by the monitor display 505 towards the user 115, for example, where the intermittent brightness control frame images are interspersed between video frame images, as will be discussed in greater detail with regard to FIG. 6A below. In such a configuration, the intermittent brightness control frame images are preferably imperceptible by the user (e.g., intermittent brightness control frames appear for a very small period of time that is imperceptible by a naked human eye) such that the user would not perceive any gaps or discontinuity between video frame images, but might perceive an overall increase or decrease in brightness emitted from the monitor display 505. Alternatively, the lighting control device 507 can be configured to control the monitor display 505 to display one or more brightness control areas to control the intensity/brightness and/or color of the light 513 emitted by the monitor display 505 towards the user 115, as will be discussed in greater detail with regard to FIG. 6B below. The one or more brightness control areas can includes an outer frame that extends around a perimeter of a video display area, other frame shaped designs with straight and/or curved edges, or other separate shapes, such as one or more blocks or round shapes, etc., that give a practical and/or artistic style to the shape.

FIG. 6A depicts a series of screenshots 601A, 601B, and 601C of a monitor display used as a light emitting device for a user videoconferencing system, according to various embodiments. In such an embodiment, the lighting control device can be configured to control the monitor display to display a video frame image 603 that includes the video image of a remote user 609A (and any background) captured by a video camera of a remote videoconferencing system to which the user is conversing via the videoconference, then display a brightness control frame image 605, and then display a video frame image 607 that includes the successive video image of the remote user 609B (and any background). The brightness control frame image 605 is preferably a solid color (e.g., white, off-white, softer natural color, etc.), and the brightness level of the brightness control frame 605 and/or the frequency of interspersing thereof with video frame images can be controlled by the lighting control device to achieve the desired level of brightness being emitted by the monitor display onto the user. A brightness control frame image 605 can be interspersed between each successive video frame image, or can be interspersed at intervals, for example, once every 5 video frame images, or once every ten video frame images, etc. depending on the frame rate capabilities of the monitor display and/or the desired light emission onto the user.

As mentioned above, the intermittent brightness control frame images are preferably imperceptible by the user (e.g., intermittent brightness control frames appear for a very small period of time that is imperceptible by a naked human eye) such that the user would not perceive any gaps or discontinuity between video frame images, but might perceive an overall increase or decrease in brightness emitted from the monitor display.

Figure 6B:
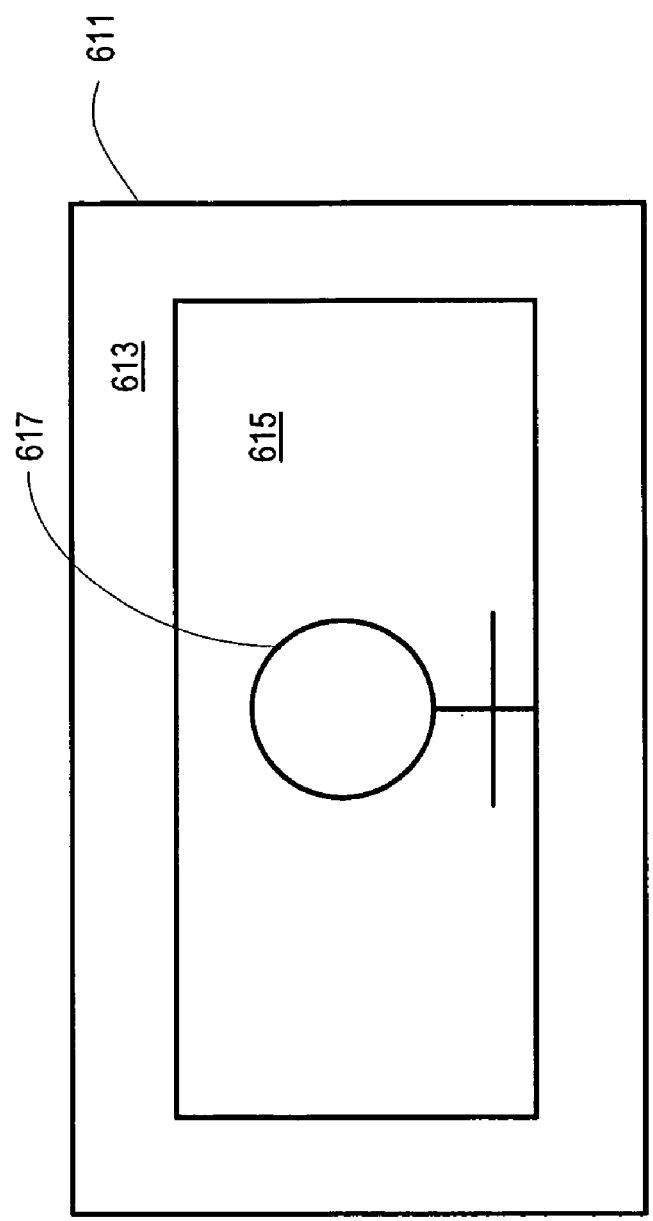
FIG. 6B depicts a screenshot of a monitor display used as a light emitting device for a user videoconferencing system, according to various embodiments.

FIG. 6B depicts a screenshot 611 of a monitor display used as a light emitting device for a user videoconferencing system, according to various embodiments. In such an embodiment, the lighting control device can be configured to control the monitor display to display a brightness control area 613 to control the light emitted by the monitor display towards the user. In this embodiment, the brightness control area 613 an outer frame that extends around a perimeter of a video display area 615, which displays the video image of a remote user 617 (and any background) captured by a video camera of a remote videoconferencing system to which the user is conversing via the videoconference. The size, shape, number, and/or brightness level of the brightness control area(s) provided in the screen of the monitor display can be controlled by the lighting control device to achieve the desired level of brightness and/or color being emitted by the monitor display onto the user. One or more brightness control areas can be displayed on the monitor display and such area(s) can be shaped to have other frame shaped designs with straight and/or curved edges, and constant or varying thickness on the sides thereof, or can be configured to have other shapes, such as one or more blocks or round shapes, etc., that give a practical and/or artistic style to the overall brightness control area(s).

The user can, in certain embodiments, set various user preferences with regard to the size, shape, number, and/or brightness level of the brightness control area(s) provided in the screen of the monitor display to provide an aesthetic appearance to the user. Also, certain preset configurations might be set for certain displays. For example, left and right brightness control areas can be provided in left and right sides of a 16:9 aspect ratio television with the center 4:3 area being used to display the image of the other user. Alternatively, the brightness control areas can be shaped as top and bottom bars on the screen. Any number of different configurations for the brightness control area(s) can be provided.

Certain embodiments can thus include a light emitting device to light the face(s) of the users of a videoconferencing system such as a video telepresence system. The light emitting device can be built into the videoconferencing system (e.g., a key light, or other light source) or come from the manipulation of the video screen (e.g., of a television (TV) set or other display). Such configurations can be particularly advantageous when used in an HD video telepresence consumer environment, where home lighting can typically be incapable of providing enough light to capture clear video images of the user.

In certain embodiments, since HD video telepresence systems typically use the consumers HD TV (e.g., a large screen liquid crystal display (LCD) or plasma display, or other HD technology), and since, during the HD video telepresence session, the consumer is typically facing the HD TV, then the HD TV can advantageously be used to provide the light to brighten up the user's otherwise darkly lit face. The HD TV image could be manipulated by the HD video telepresence system to cast bright light towards the users face. This could be performed in a number of ways. For example, the TV screen could be manipulated to switch from bright white to the image of the user on the other end of the conversation. This switching is to be executed faster than the human eye can detect (e.g., like movie frames on a roll of movie film). Alternatively, the video image on the TV screen can be reduced in size, leaving a bright white boarder around the image, such that this bright white boarder provides the light to brighten the users face.

In other embodiments, an HD camera could have one or more embedded light that cast light towards the user's face, where this light is under the control of the HD video telepresence system and can be enabled when needed.

In certain embodiments, a STB or camera can detect the lighting or provide an example of the lighting on the television for the user to tune the amount of light, for example, whereby as the user selects more light, the TV brightness increases the amount of white space and intensity to bring up the light level on the users face. Alternately, the TV can show buffered video recorded when the TV is as maximum light output to the user, so the user can judge the amount of light level provided. The various brightness options can be user controlled options, and there may not always be a need for additional light on the users face.

The described embodiments can thus be configured as a hardware solution, a software solution, or a combination thereof.

One of ordinary skill in the art would recognize that the processes described above may be implemented via software, hardware (e.g., general processor, Digital Signal Processing (DSP) chip, an Application Specific Integrated Circuit (ASIC), Field Programmable Gate Arrays (FPGAs), etc.), firmware, or a combination thereof. Such exemplary hardware for performing the described functions is detailed below.

Figure 7:
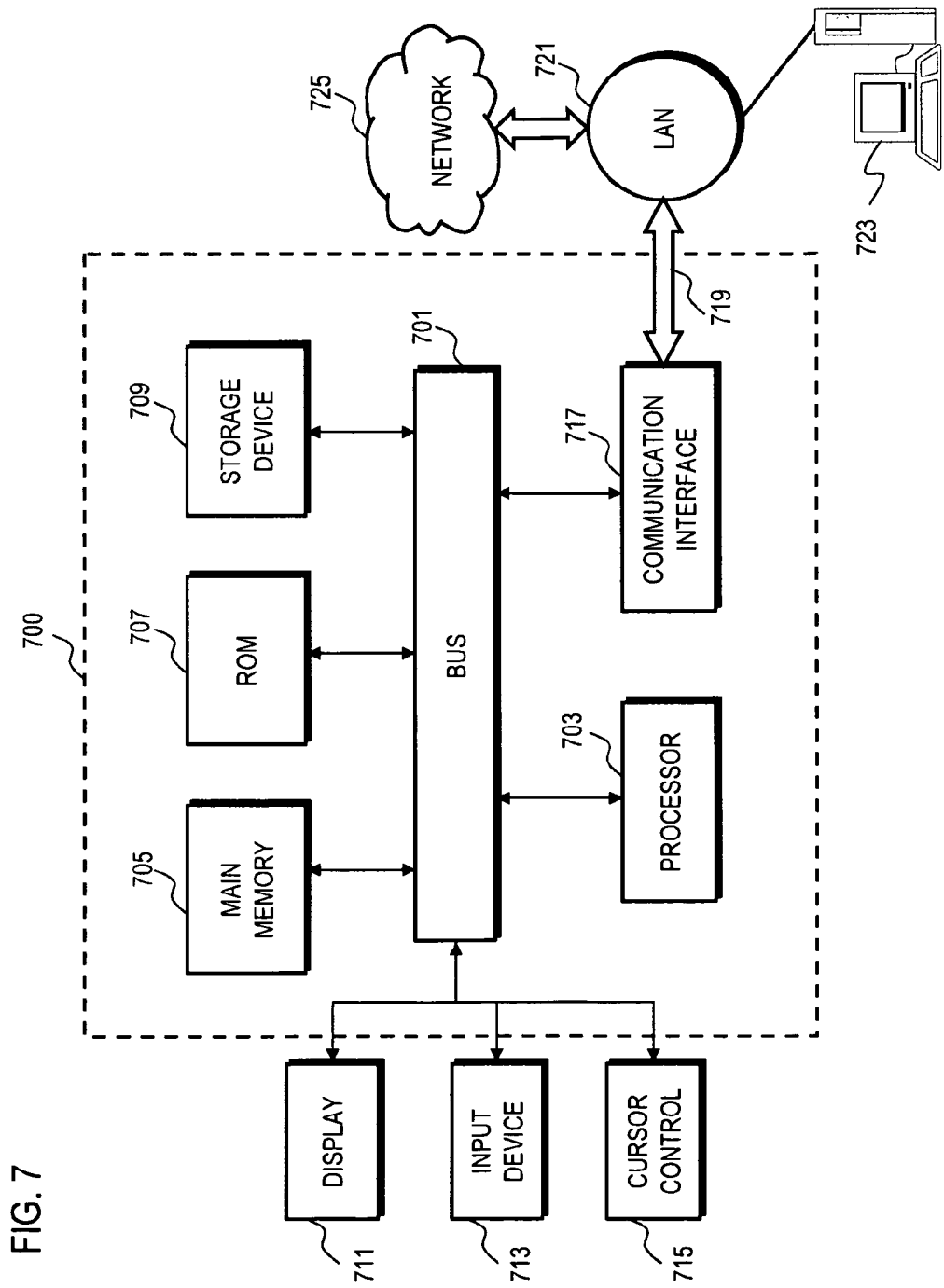
FIG. 7 is a diagram of a computer system that can be used to implement various embodiments.

FIG. 7 illustrates a computer system 700 upon which various embodiments can be implemented. The computer system 700 includes a bus 701 or other communication mechanism for communicating information and a processor 703 coupled to the bus 701 for processing information. The computer system 700 also includes main memory 705, such as a random access memory (RAM) or other dynamic storage device, coupled to the bus 701 for storing information and instructions to be executed by the processor 703. Main memory 705 can also be used for storing temporary variables or other intermediate information during execution of instructions by the processor 703. The computer system 700 may further include a read only memory (ROM) 707 or other static storage device coupled to the bus 701 for storing static information and instructions for the processor 703. A storage device 709, such as a magnetic disk or optical disk, is coupled to the bus 701 for persistently storing information and instructions.

The computer system 700 may be coupled via the bus 701 to a display 711, such as a cathode ray tube (CRT), liquid crystal display, active matrix display, or plasma display, for displaying information to a computer user. An input device 713, such as a keyboard including alphanumeric and other keys, is coupled to the bus 701 for communicating information and command selections to the processor 703. Another type of user input device is a cursor control 715, such as a mouse, a trackball, or cursor direction keys, for communicating direction information and command selections to the processor 703 and for controlling cursor movement on the display 711.

According to one embodiment of the invention, the processes described herein are performed by the computer system 700, in response to the processor 703 executing an arrangement of instructions contained in main memory 705. Such instructions can be read into main memory 705 from another computer-readable medium, such as the storage device 709. Execution of the arrangement of instructions contained in main memory 705 causes the processor 703 to perform the process steps described herein. One or more processors in a multi-processing arrangement may also be employed to execute the instructions contained in main memory 705. In alternative embodiments, hard-wired circuitry may be used in place of or in combination with software instructions to implement the described embodiments. Thus, described embodiments are not limited to any specific combination of hardware circuitry and software.

The computer system 700 also includes a communication interface 717 coupled to bus 701. The communication interface 717 provides a two-way data communication coupling to a network link 719 connected to a local network 721. For example, the communication interface 717 may be a digital subscriber line (DSL) card or modem, an integrated services digital network (ISDN) card, a cable modem, a telephone modem, or any other communication interface to provide a data communication connection to a corresponding type of communication line. As another example, communication interface 717 may be a local area network (LAN) card (e.g. for Ethernet™ or an Asynchronous Transfer Model (ATM) network) to provide a data communication connection to a compatible LAN. Wireless links can also be implemented. In any such implementation, communication interface 717 sends and receives electrical, electromagnetic, or optical signals that carry digital data streams representing various types of information. Further, the communication interface 717 can include peripheral interface devices, such as a Universal Serial Bus (USB) interface, a PCMCIA (Personal Computer Memory Card International Association) interface, etc. Although a single communication interface 717 is depicted in FIG. 7, multiple communication interfaces can also be employed.

The network link 719 typically provides data communication through one or more networks to other data devices. For example, the network link 719 may provide a connection through local network 721 to a host computer 723, which has connectivity to a network 725 (e.g. a wide area network (WAN) or the global packet data communications network now commonly referred to as the "Internet") or to data equipment operated by a service provider. The local network 721 and the network 725 both use electrical, electromagnetic, or optical signals to convey information and instructions. The signals through the various networks and the signals on the network link 719 and through the communication interface 717, which communicate digital data with the computer system 700, are exemplary forms of carrier waves bearing the information and instructions.

The computer system 700 can send messages and receive data, including program code, through the network(s), the network link 719, and the communication interface 717. In the Internet example, a server (not shown) might transmit requested code belonging to an application program for implementing certain embodiments through the network 725, the local network 721 and the communication interface 717. The processor 703 may execute the transmitted code while being received and/or store the code in the storage device 709, or other non-volatile storage for later execution. In this manner, the computer system 700 may obtain application code in the form of a carrier wave.

The term "computer-readable medium" as used herein refers to any medium that participates in providing instructions to the processor 703 for execution. Such a medium may take many forms, including but not limited to non-volatile media, volatile media, and transmission media. Non-volatile media include, for example, optical or magnetic disks, such as the storage device 709. Volatile media include dynamic memory, such as main memory 705. Transmission media include coaxial cables, copper wire and fiber optics, including the wires that comprise the bus 701. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the described embodiments may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

While the invention has been described in connection with a number of embodiments and implementations, the invention is not so limited but covers various obvious modifications and equivalent arrangements, which fall within the purview of the appended claims. Additionally, the features of the invention can be combined in a numerous combinations and permutations, in which the appended claims are illustrative in nature.

What is claimed is:

1. A method comprising:
    emitting light onto a user of a videoconferencing system that displays video frame images; and
    controlling the light emitted onto the user in conjunction with capturing of an image of the user by the videoconferencing system to modify the image of the user captured by the videoconferencing system by interspersing brightness control frame images between the video frame images.

2. The method according to claim 1, wherein the light is emitted by one or more lights incorporated into a set top box or camera of the videoconferencing system.

3. The method according to claim 1, wherein the light is emitted by a monitor display of the videoconferencing system.

4. The method according to claim 3, wherein the controlling of the light emitted is performed by controlling the monitor display to control the light emitted by the monitor display towards the user.

5. The method according to claim 4, wherein the brightness control frame images are imperceptible by the user.

6. The method according to claim 3, wherein the controlling of the light emitted is performed by controlling the monitor display to display one or more brightness control areas to control the light emitted by the monitor display towards the user.

7. The method according to claim 6, wherein the one or more brightness control areas includes an outer frame that extends around a perimeter of a video display area.

8. An apparatus comprising:
    a light emitting device that displays video frame images; and
    a lighting control device configured to control light emitted from said light emitting device onto a user of a videoconferencing system in conjunction with capturing of an image of the user by the videoconferencing system to modify the image of the user captured by the videoconferencing system by interspersing brightness control frame images between the video frame images.

9. The apparatus according to claim 8, wherein said light emitting device is one or more lights incorporated into a set top box or camera of the videoconferencing system.

10. The apparatus according to claim 8, wherein said light emitting device is a monitor display of the videoconferencing system.

11. The apparatus according to claim 10, wherein said lighting control device is configured to control said monitor display to control the light emitted by said monitor display towards the user.

12. The apparatus according to claim 11, wherein said brightness control frame images are imperceptible by the user.

13. The apparatus according to claim 10, wherein said lighting control device is configured to control said monitor display to display one or more brightness control areas to control the light emitted by said monitor display towards the user.

14. The apparatus according to claim 13, wherein said one or more brightness control areas includes an outer frame that extends around a perimeter of a video display area.

15. A system comprising:
a video camera configured to be operated with a videoconferencing system to capture images of a user;
a light emitting device that displays video frame images;
a lighting control device configured to control light emitted from said light emitting device onto the user of a videoconferencing system in conjunction with capturing of the images of the user by said video camera to modify the images of the user captured by said video camera by interspersing brightness control frame images between the video frame images.

16. The system according to claim 15, wherein said light emitting device is one or more lights incorporated into a set top box or said video camera of the videoconferencing system.

17. The system according to claim 15, wherein said light emitting device is a monitor display of the videoconferencing system.

18. The system according to claim 17, wherein said lighting control device is configured to control said monitor display to control the light emitted by said monitor display towards the user and wherein said brightness control frame images are imperceptible by the user.

19. The system according to claim 17, wherein said lighting control device is configured to control said monitor display to display one or more brightness control areas to control the light emitted by said monitor display towards the user.

20. The system according to claim 19, wherein said one or more brightness control areas includes an outer frame that extends around a perimeter of a video display area.

\* \* \* \* \*